Sept. 23, 1958  A. E. HEIN  2,853,028
DOUGH HANDLING APPARATUS
Filed Feb. 25, 1955  2 Sheets-Sheet 2
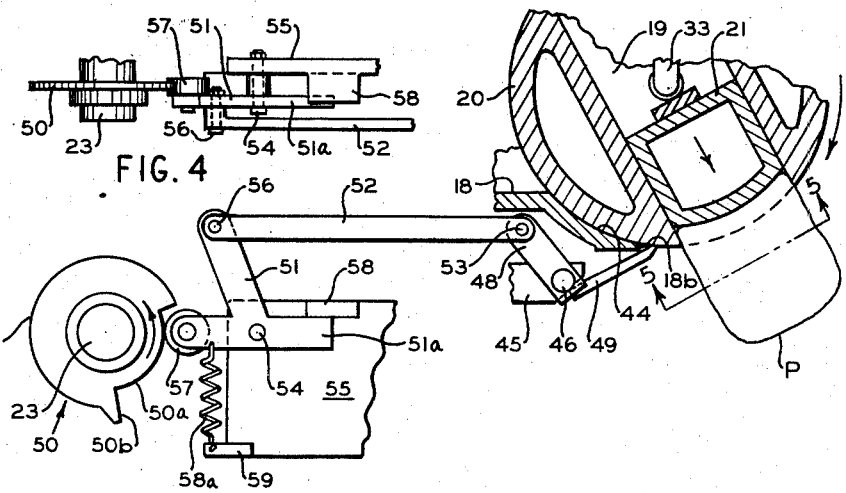
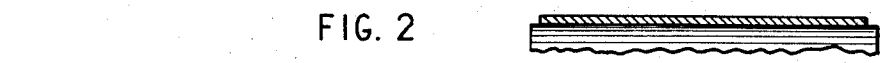
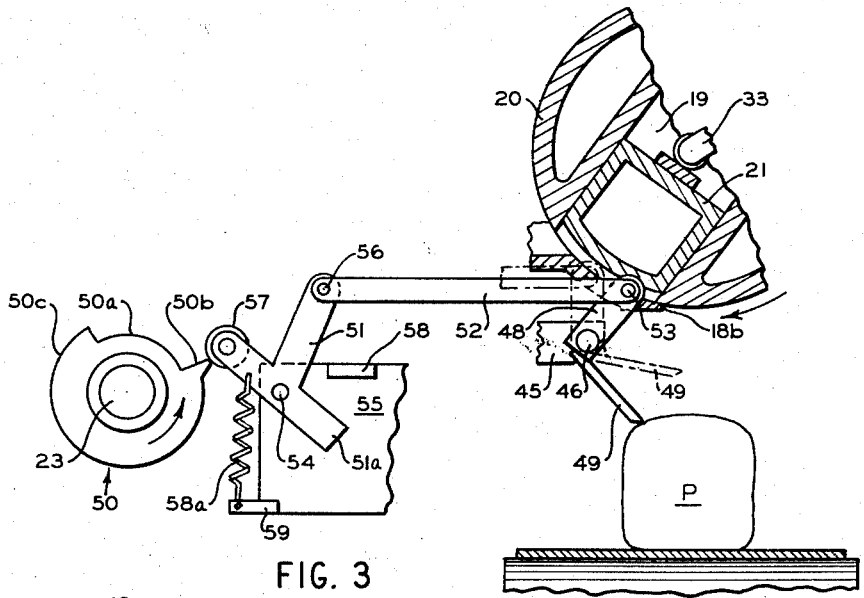
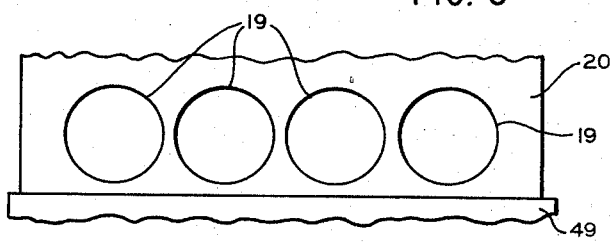
INVENTOR.
AUGUST E. HEIN
BY
ATTORNEYS

United States Patent Office 2,853,028
Patented Sept. 23, 1958

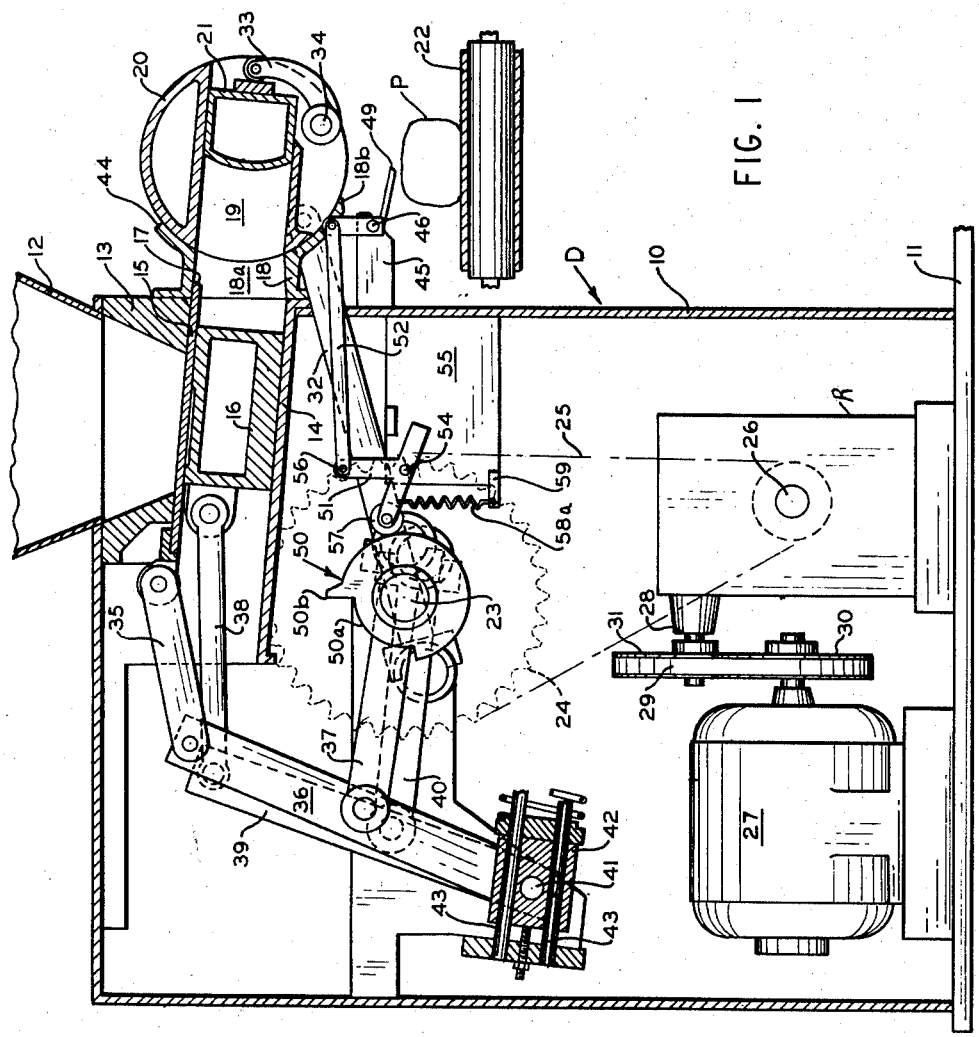

2,853,028
DOUGH HANDLING APPARATUS

August E. Hein, Cincinnati, Ohio, assignor to Century Machine Company, Cincinnati, Ohio, a corporation of Ohio Application February 25, 1955, Serial No. 490,583

11 Claims. (Cl. 107—15)

This invention relates to dough handling apparatus and more particularly to dough dividers and stripping and depositing means which are adapted to be employed in conjunction with the measuring heads thereof.

A problem long recognized in the baking trade in the discharge of small dough pieces from a dough dividing machine such as shown in Patent No. 2,652,790 is the difficulty of dropping them uniformly to the transfer conveyor. Lighter dough pieces such as those which will be formed into buns or rolls will often because of their somewhat sticky or adherent nature tend to hesitate on the dividing head prior to dropping to the conveyor traveling underneath and consequently many of the dough pieces leaving the divider will not be evenly spaced apart on the conveyer. In some instances a dough piece may hesitate sufficiently before falling to the slowly traveling transfer conveyer so that a dough piece in the same batch is dropped on top of it. Various stationary strippers such as wires and the like have been employed to prevent dough pieces from clinging to the face of the discharging ram or to the edge of the dough cylinder, however in general such devices have not been satisfactory because the dough pieces have often tended to hesitate on the strippers themselves prior to dropping to the conveyer below. In depending upon the forces of gravity to transfer the dough pieces from the divider or the like to the conveyer, control of the dough pieces is lost and the result is the non-uniform spacing of the dough pieces discharged which in many instances will be sufficiently misspaced so that subsequent operations cannot be performed on a particular dough piece or group of dough pieces and the latter must be removed from the processing line.

One of the prime objects of the instant invention is to provide simple and practical apparatus which not only strips the dough pieces from the measuring head but also retains control of them throughout their travel to the discharge conveyer by positively transferring them immediately to the conveyer. In the instant operation each dough piece or group of dough pieces is propelled to the conveyer by means which operates cyclically in definite timed relation so there can be no hesitancy which would create the variable spacing referred to or result in one dough piece dropping on top of another dough piece.

A further object of the invention is to provide means of the type described which is disposed in an out of the way rest position until just prior to the time it is to be employed to strip and deposit a batch of dough pieces and consequently will not interfere with the operation of any of the other elements of the divider or tend to strip off portions of the dough pieces during the forward revolution of the measuring head.

Another object of the invention is to design stripping and depositing means for a divider or the like which may be driven in perfect synchronism with the other operating elements thereof from the same mechanism which drives the said other elements.

A further object of the invention is to design highly reliable and efficient stripping and depositing means which operates to flick the dough pieces to the discharge conveyer and thence is sharply withdrawn so that dough pieces will never tend to cling to the said means.

Another object of the invention is to design stripping and depositing means which are of simple and practical construction and can be readily mounted on dividers which are currently in use without extensive rebuilding of these machines and undue expense.

A further object of the invention is to design relatively rapidly operating stripping and depositing apparatus of the type referred to which does not harm the dough pieces it handles.

A still further object of the invention is to provide a divider with stripping and depositing means of the type described which can be very economically manufactured and assembled on the machine without adding appreciably to the final cost thereof.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 1 is a sectional side elevational view showing my stripping and depositing means mounted on a divider with the said means being shown in rest position.

Fig. 2 is an enlarged, fragmentary, side elevational view showing the stripping and depositing means in position to strip a set of dough pieces from the rotary dividing head.

Fig. 3 is a similar view showing the apparatus depositing dough pieces on the conveyer below.

Fig. 4 is a fragmentary, top plan view of the mechanism for driving the stripping and depositing apparatus only.

Fig. 5 is a fragmentary, front elevational view taken on the line 5—5 of Fig. 2 with the dough pieces omitted from the view in the interests of clarity.

Referring now more particularly to the accompanying drawings in which I have shown a preferred embodiment of the invention a letter D generally indicates a divider on which the stripping and depositing apparatus referred to may be employed. For the sake of convenience the machine depicted is the divider shown in the previously mentioned patent, however it is to be understood that the apparatus may as easily be used with various other machines of other design wherein the same or similar problems are to be solved and it is to be understood that I do not wish to limit the invention in any manner by showing the instant divider.

The divider D illustrated in Fig. 1 includes a frame or housing 10 mounted on a base 11 and provided at its upper end with a hopper 12 which is supplied with dough in the usual manner. The hopper 12 and a dough box plate 13 within the housing 10 which forms an extension of the hopper 12 will when permitted to do so supply a charge of dough to a doughbox 14. The passage of dough from the hopper is regulated by a reciprocatory knife 15 which in forward position as in Fig. 1 forms a closure for the bottom of the hopper extension 13. Mounted between the bottom of the box 14 and the knife 15 is a dough plunger 16 which compresses the charge of dough in the box 14 and forces it to flow through the end outlet 17 of the box into a dividing head 18 which is in pressure tight engagement therewith as described in the aforementioned patent. The head 18 has a plurality of passages 18a through which the dough passes into a corresponding plurality of chambers or cylinders 19 in a measuring head 20. While four cylinders are shown in the instant measuring head obviously any other number of cylinders could have been shown. The measuring head 20 which is revolvably supported in any acceptable manner has rams or pistons 21 in the cylinders 19 thereof which move from the ends of the cylinder in which they are shown in Fig. 1 to the opposite ends thereof to force the dough pieces P from the cylinders 19 when the head is revolved so that the bores or cylinders 19 open downwardly to the transversely disposed underlying conveyer belt 22 which removes the dough pieces to another machine in the processing line.

A crankshaft 23 is provided to actuate the measuring head 20, knife 15, and dough plunger 16 in timed sequence, and driving the crankshaft 23 through a sprocket 24 mounted on one end thereof is a chain 25 which is trained around a sprocket on the output shaft 26 of a speed reduction unit R. A motor 27 is connected to the input shaft 28 of the reducer by a drive belt 29 which is trained around sheaves 30 and 31 on the motor shaft and shaft 28 respectively.

A connecting rod 32 mounted on one throw of the crankshaft 23 rotates the measuring head 20 and reciprocates the rams or pistons 21 to eject the dough pieces at the proper time in the cycle, the upper end of the rod 32 being connected to the head 20 eccentrically to rotate the same and the rams being actuated upon rotation of the head as in the patent mentioned through a rocker arm 33 on a shaft 34.

The knife 15 and plunger 16 are also driven through connecting rods which are mounted on other throws of the crankshaft 23. The knife 15 which is operated slightly in advance of the plunger 16, is pivotally connected by a link 35 to a floating link 36 which is actuated by the connecting rod 37, and the plunger 16 is pivotally connected by a link 38 to a second floating link 39 which is actuated through the connecting rod 40. Both floating links 36 and 39 may be pivoted at their lower ends as at 41 to a spring loaded adjustable block 42 which is slidable on a pair of rods 43 as in the aforementioned patent.

Inasmuch as a rotary rather than reciprocatory measuring head is illustrated, the outlet side 44 of the dividing head 18 is curvilinear and forms a pressure tight bearing or seal for the cylindrical measuring head 20. In Fig. 1 the knife 15 has cut off a charge of dough which has flowed or settled into the box 14 and the plunger 16 is pushing the dough through the openings in the dividing head 18 into the cylinders 19 in the measuring head 20. The head 20 is about to be rotated in a counterclockwise or forward direction through an angle of approximately 90 degrees to a point which is substantially beyond the lower edge 18b of the dividing head 18. As soon as the edge 18b is cleared the rams 21 begin to move in the cylinders 19 to force the dough pieces P therein outwardly and by the time the head has reached its limit of rotation and returned to a position in which the cylinders are adjacent the edge 18b the rams have moved to the mouths of the cylinders and the dough pieces P are in position to fall to the slowly moving conveyer 22. The mechanism thus far described forms the subject matter of Patent 2,652,790, as previously noted, and is widely used in the industry. I shall not describe it in further detail since it forms no part of the instant invention except insofar as certain elements thereof are combined with the stripping and depositing mechanism which will now be described.

Pivotally supported in blocks or brackets 45 which extend from the front of the housing 10 is a shaft 46 which rigidly supports a stripper blade 49. The blade 49 is of sufficient width so that it extends to the measuring head 20 forwardly of the edge 18b when it is moved into position to strip the dough pieces from the head (see Fig. 2) and is, of course, of sufficient length (see Fig. 5) so that it will operate to strip dough pieces from all of the bores or cylinders 19. The position of the blade 49 is controlled by a cam 50 mounted on one end of the crankshaft 23, through a bell crank lever 51 and a connecting rod 52 which is pivotally connected to the upper end of a bar 48 as at 53. Clearly the bar 48 which is rigidly connected to the shaft 46, and the blade 49 form in effect a second bell crank lever which when the cam 50 is moving to the position in which it is shown in Fig. 3 deposits the stripped dough pieces in uniformly spaced relation on the conveyer 22. The angular lever 51 which is pivotally mounted as at 54 on a bracket 55 which is secured to the frame 10 is pivotally connected to the rod 52 at 56 and has a follower roller 57 riding on the cam 50. Additionally, the lever 51 has a forwardly projecting portion 51a which engages a laterally projecting stop 58 on the bracket 55 to limit the upward swing of the blade 49 and hold its stripping edge just out of engagement with the surface of the head 20.

The cam 50 is shaped as shown to operate the blade in timed relation with the other elements of the divider. When the measuring head 20 is returning in a clockwise direction and the rams 21 are ejecting dough pieces from the cylinders 19 the follower roller 56 is riding on the surface 50a of the cam (see Fig. 2) and the blade operates to strip dough pieces from the faces of the rams 21 and the marginal edges of the cylinders 19. These dough pieces will immediately be flicked sharply downwardly to the conveyer 22 as the roller 57 rides the surface 50b of the cam. The action is rapid and abrupt so that the dough pieces are propelled with an acceleration greater than the acceleration due to gravity and are deposited in the position in which they are shown in Fig. 3 without losing contact with the blade 49. When the roller 56 immediately returns to the surface 50c of the cam the blade 49 is snapped sharply up to the position in which it is shown in Fig. 1 and in broken lines in Fig. 3. Since a far greater portion of the surfaces of the dough pieces are in engagement with the conveyer 22 than are in engagement with the blade 49 and the action of the blade 49 is so sharp, the dough pieces will never lift with the blade nor will portions thereof tend to be torn off and accompany the blade. The blade 49 swings downwardly a sufficient distance so that it acts to pat the dough pieces on the conveyer before being so abruptly withdrawn. During the time that the measuring head 20 is returning to the position in which it is shown in Fig. 1 to receive new charges of dough in its cylinders 19 and until the head has again moved forwardly or counterclockwisely so that the cylinders 19 are beyond the point where the scraper blade 49 is practically in engagement with the head 20 the blade remains in this intermediate rest position. Thus, when the dough which is compressed in the pockets or cylinders 19 by the plunger 16 tends to expand slightly or grow after it clears the edge 18a and is exposed to atmosphere, the blade 49 is not in a position where it would chop off the expanded portions. The spring 58a which is connected at one end to the lever 51 and at its other end to a lug 59 on the bracket 55 tends to return the lever 51 to the position in which it is shown in Fig. 2.

It should be apparent that since control of the dough is never lost and uncontrollable forces such as the forces of gravity play no part in the operation, the dough pieces must always be deposited on the conveyer 22 at exactly the same instant in the cycle of operation and will accordingly be uniformly spaced apart on the conveyer 22 as they progress to the next machine in the processing line. The apparatus shown and described to effect this uniformity of deposition is very simple and practical and can obviously be very economically fabricated and assembled on dividers of various kinds. It should be understood however, that the invention may well be employed in conjunction with other machines to process other products and that the invention is not to be restricted to the particular application shown. Moreover, it is expected that various equivalent changes may be made in the various elements which comprise the invention within the scope of the appended claims and it is to be emphasized that the drawings and descriptive matter are in all cases to be interpreted as illustrative of the invention rather than as limiting the scope thereof.

What I claim is:

1. In a machine for processing products of an adherent nature such as dough, an ejector head moving in a defined path of travel, a movable stripper blade extending in one position toward the path of travel of said head and terminating just short thereof, a receiving surface under said blade, and means for moving said blade from said one position toward the surface to deposit the product stripped from the head on said surface.

2. In a machine for processing products of an adherent nature such as dough, a pivotal stripper blade, a discharge member moving past said blade, ejector means in the member moving said product out of the member so that it is received by the blade, and means swinging said blade sharply downwardly to flick said product to said receiving surface.

3. In a machine for processing products of an adherent nature such as dough, a pivotal stripper blade, a head member above said blade movable through a defined path of travel past said blade and receiving the product at one point in its path of movement and ejecting it at another, a receiving surface under said blade, means associated with said head member moving said product downwardly from said head so that it is received on the blade as the head moves past the blade, and means swinging said blade sharply downwardly to flick said product to said surface.

4. The combination defined in claim 3 in which said latter means also immediately moves said blade upwardly to an intermediate position between said surface and head after it has been swung downwardly.

5. In a machine for processing products of an adherent nature such as dough, a head member movable forwardly and rearwardly through a defined path of travel, a pivotal stripper blade under said head member swingable up to a position interjacent the limits of travel of said head, means for loading said product into said head when the latter is at substantially the rearward limit of its travel, a receiving surface under said head, means for moving said head member through its path of travel, ejector means in said head for commencing to move said product thereout of after it has moved through a portion of its forward travel, and means operating in timed relation with said loading means, head moving means, and ejector means, for pivoting said blade up toward said head when the head is near the limit of its forward travel so that the blade will strip the said product from the head as the latter returns to loading position.

6. The combination defined in claim 5 in which said blade pivoting means immediately swings said blade downwardly toward said surface when the head has reached a certain position in its return travel and said blade has stripped the product therefrom to deposit the product on the surface.

7. The combination defined in claim 6 in which said blade pivoting means thence immediately swings said blade upwardly out of engagement with the product to an intermediate position between the surface and head and maintains it there until it is ready to be swung upwardly to said head once again.

8. In a dough divider, a revolvably mounted measuring head having generally radially extending, substantially parallel, dough receiving cylinders formed therein, dough box means including a curvilinearly shaped outlet receiving a portion of said head and sealing it off from atmosphere, pistons forming closures for certain ends of said cylinders, means for transferring dough in said box to and packing it into the cylinders in said head under pressure, said means operating when the head is in a given position with the ends of its cylinders opposite those in which said pistons are disposed open to said box, means for revolving said head through an arc of travel sufficient to bring the cylinders in said head outwardly of the said head receiving outlet and leading downwardly, a transversely disposed conveyor under said head, means moving said pistons in said cylinders to eject the dough in said cylinders on the continuing revolution of the head after the said cylinders clear the said outlet, said means revolving the head operating to reverse its revolution after the cylinders have traveled slightly beyond said outlet edge to return the head to dough receiving position, a pivotally supported stripper blade normally maintained substantially below said head in a rest position swingable up to said head at substantially the time the head reverses its revolution to a position in which it will strip the dough pieces pushed out by said pistons from said head, and means operating immediately in timed relation with said head to swing said blade downwardly and pat said dough pieces on the conveyer and thence to withdraw said blade immediately to said rest position intermediate said conveyer and head.

9. The combination defined in claim 8 in which spring means is employed to snap said blade from down position to rest position and move said blade from rest position to stripping position.

10. The combination defined in claim 8 in which a common revolvable element is employed to drive said means revolving the head, and means for transferring dough to said cylinders, and said means for operating said blade, in timed relation.

11. The combination defined in claim 10 in which said means for operating the blade comprises a cam on said common element, a bell crank follower associated therewith, and a connecting rod to said blade.

References Cited in the file of this patent

UNITED STATES PATENTS

| | | |
|---|---|---|
| 1,283,987 | Van Houten | Nov. 5, 1918 |
| 1,720,097 | Scholz | July 9, 1929 |
| 2,081,933 | Kauffman | June 1, 1937 |

FOREIGN PATENTS

| | | |
|---|---|---|
| 323,412 | Italy | Dec. 20, 1934 |